United States Patent [19]

Mouton

[11] Patent Number: 4,569,202

[45] Date of Patent: Feb. 11, 1986

[54] PROCESS AND DEVICE FOR REDUCING THE SELF-HEATING OF THE FUEL IN A TURBOJET ENGINE FUEL SYSTEM

[75] Inventor: Pierre C. Mouton, Grigny, France

[73] Assignee: Societe Nationale d'Etude et de Construction de Moteurs d'Aviation "S.N.E.C.M.A.", Paris, France

[21] Appl. No.: 647,386

[22] Filed: Sep. 5, 1984

[30] Foreign Application Priority Data

Sep. 7, 1983 [FR] France .................. 83 14248

[51] Int. Cl.⁴ .............................. F02C 7/22
[52] U.S. Cl. ................................ 60/734; 417/295
[58] Field of Search ............. 60/39.06, 39.281, 734; 417/295, 310

[56] References Cited

U.S. PATENT DOCUMENTS 2,760,564 8/1956 Getz et al. ................ 417/295
2,823,518 2/1958 Murray .................... 60/39.281
4,332,527 6/1982 Moldovan et al. .

FOREIGN PATENT DOCUMENTS 1231933 1/1961 Fed. Rep. of Germany ...... 417/295
1591463 6/1970 France .
2232956 3/1975 France .
393791 8/1932 United Kingdom .
741442 12/1955 United Kingdom .
1081711 8/1967 United Kingdom .

Primary Examiner—Louis J. Casaregola
Attorney, Agent, or Firm—Bacon & Thomas

[57] ABSTRACT

A device and method are disclosed to reduce the self-heating of the fuel in an aircraft turbojet engine fuel system by inducing cavitation in a positive displacement pump in the system. The cavitation is induced by modulating the charging or inlet pressure of the pump by the action of a modulating or regulating valve placed in the pump inlet line.

6 Claims, 3 Drawing Figures

PROCESS AND DEVICE FOR REDUCING THE SELF-HEATING OF THE FUEL IN A TURBOJET ENGINE FUEL SYSTEM

BACKGROUND OF THE INVENTION

1. Field of the Invention.

The instant invention relates to fuel systems for turbojet engines, more particularly toward a method and device for preventing excessive self-heating of the fuel in such systems.

2. Brief Description of the Prior Art.

One of the major advantageous characteristics of a dual flow turbojet engine (particularly such dual flow engines with a high dilution rate) is their very low fuel consumption at high altitudes, particularly when idling. In those conditions the rotational speed of the engine is rather high. The fuel systems for such engines typically have a positive displacement pump driven by the engine to supply the fuel to the engine's combustion chambers. A regulating value and a return line or recirculating line usually connect the output line of the positive displacement pump to the inlet line to recirculate the fuel which is not required by the engine. The output of the positive displacement pump is, of course, designed to supply the maximum amount of fuel required by the engine during high speed and/or low altitude operations. For those reasons, the output of the positive displacement pump results in a rather significant amount of fuel being recirculated during the low speed operations at altitude.

The large amount of recirculated fuel during the low speed, high-altitude operations results in an excessive fuel temperature rise. Depending upon the conditions at which the aircraft operates, the temperature rise may exceed 100° F.

One solution to this problem is set forth in French Pat. No. 2,232,956 in which the turbojet engine fuel system utilizes a variable displacement pump. In this system, the output of the pump is decreased as the engines demand for fuel is reduced. Although this system has basically proven successful, the complexity of the variable displacement pump has decreased the reliability of the system as compared to a standard, positive displacement pump having a constant displacement volume (such as a gear pump).

SUMMARY OF THE INVENTION

The instant invention defines a fuel system for a turbojet engine which combines the advantages of sturdy construction and reliability of a constant output, positive displacement pump with the flexibility of such a pump having a variable displacement. This objective is achieved by defining a process and a device to induce cavitation in the fixed, positive displacement pump in order to control its output. The invention allows a positive displacement pump with a constant displacement to be operated in the manner of a variable displacement pump by reducing the amount of fluid which is displaced by the engagement of the gears of the positive displacement pump. The amount of fuel filling the space between the teeth of the gear pump (or the space between the vanes of a vane pump) is controlled by modulating or restricting the charging pressure in the fuel entering the pump so as to regulate the rate of induced cavitation.

It has been found that a positive displacement gear pump may operate in a continuous and stable manner with reduced inlet or charging pressures. The variation of the flow rate with the charging pressure becomes more gradual and stable with a reduction in size of the gear teeth and an increase in the diameter of the gears (so as to attain high peripheral velocities at the tip of the teeth).

The gear type pump when utilized with the instant invention uses conventional roller bearings and rotors with a constant clearance. The use of hydrodynamic type bearings, as in the prior art, is prohibited, since the inducing of cavitation within the pump would affect the fluid film of the hydrodynamic bearings.

Cavitation occurs within the gear pump when pressurization of the fuel above the vapor pressure is insufficient to accelerate the fuel sufficiently enough to completely fill the cavity formed by the displacement of the gear teeth. The loss of fuel fill begins at the distal end of the teeth, where the dynamic pressure required for the fuel to follow the tooth is higher than the excess pressure available with respect to the vapor pressure, and continues toward the base of the tooth where the tangential velocity is lower. The energetic effect of the cavitation on the positive displacement pump leads to a reduction in the force acting on the shaft of the pump which is proportional to the drop in the rate of flow. For very low fuel consumption rates at low speeds and/or during altitudes, the relative reduction of the heating of the recirculated fuel compared to a fully charged, positive displacement pump, is appoximately equal to the relative reduction of the flow rate delivered by the pump due to the cavitation. Reductions in temperature of more than 50% have been accomplished with the instant invention.

However, it is known that cavitation in a positive displacement pump increases the wear causing a consequent reduction in the useful life of the pump. Consequently, the induction of cavitation in the pump as a means to reduce the self-heating of the recirculated fuel must be limited to extreme conditions which are infrequent or transitory, and wherein the temperature of the recirculated fuel would attain very high values.

The device for inducing the cavitation in the positive displacement pump comprises a limiting valve located in the pump inlet line. When the regulated valve is at its maximum open position, due to the pressure exerted thereon by the recirculating fuel, the limiting valve is positioned such that it modulates or limits the pressure of the incoming fuel to the positive displacement pump to induce cavitation within the pump.

DETAILED DESCRIPTION OF THE PREFERRED EMBODIMENT

Figure 1:
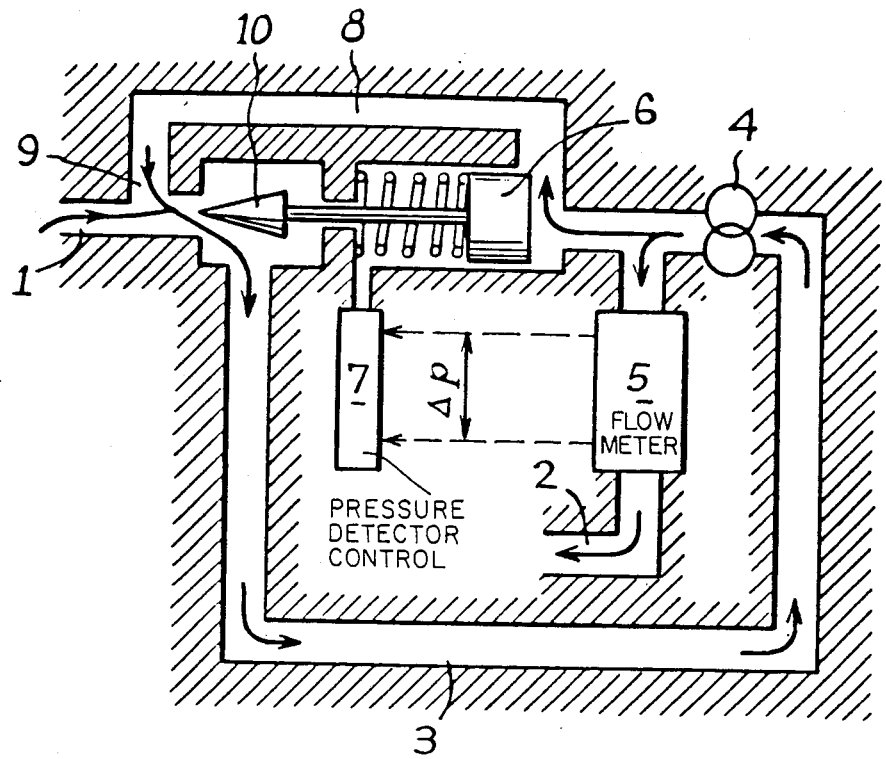
FIG. 1 is a partial schematic diagram of a turbojet fuel system showing the device according to the invention.

FIG. 1 shows a partial schematic diagram of the device according to the invention for inducing cavitation in the positive displacement fuel pump. Inlet line 1 interconnects the positive displacement pump 4 with a fuel supply tank (not shown) which may incorporate a low pressure fuel supply pump as is well known in the art. Positive displacement pump 4 has its outlet line 2 connected to the turbojet engine (not shown) to supply fuel to the combustion chambers of the engine. Inlet line 1 communicates with supply line 3 to supply fuel to the positive displacement pump 4.

A return line 8 interconnects the outlet line 2 of positive displacement pump 4 with inlet line 1 in order to recirculate the fuel which is not required for the engine operation. As noted previously, during low speed and/or high altitude operating conditions, the engine requires only a small proportion of the output of pump 4 which requires the remaining fuel to be recirculated through line 8. Under these extreme conditions, the temperature of the fuel due to the recirculation and its subsequent mixing with the incoming fuel, will rise to an unacceptable level.

A regulating valve 6 is provided in the return line 8 such that its position varies as the flow rate in the return line increases or decreases. A metering device 5 is provided in the outlet line 2 which meters the amount of fuel supplied to the engine as is known in the art. A pressure loss detector 7 is interconnected with metering device 5 so as to detect the pressure loss therein. The detector 7 communicates with the side of regulating valve 6 opposite to that in contact with the fuel flowing through the return line 8. A pressure limiting or modulating valve 10 is interposed in the inlet line downstream of the junction 9 of the inlet line 1 and the return line 8. A valve seat may be defined on the inlet line 1 such that, as the conical valve 10 moves toward and away from the seat, the pressure in supply line 3 is regulated. In the example shown in FIG. 1, modulating valve 10 is directly attached to the regulating valve 6, although other means may be utilized to interconnect them such that the action of the regulating valve 6 controls the modulating valve. As the flow rate in the return line increases, the regulating valve 6 opens and the modulating valve 10 moves toward its seat, reducing the charging or incoming pressure in line 3.

Valves 6 and 10 are dimensioned such that the valve 10 does not begin reducing the inlet pressure to the positive displacement pump 4 until the valve 6 has attained its maximum opening. This will occur only in the transitory or rare cases wherein the engine has very low fuel demands at high rotating speeds. Under these conditions, the inlet pressure in supply line 3 to positive displacement pump 4 is reduced in order to induce cavitation in the pump. Since the cavitation occurs only in rare or transitory instances the excessive wear on the pump structure caused by the cavitation is minimized and the useful life of the pump remains within acceptable limits.

Figure 2A:
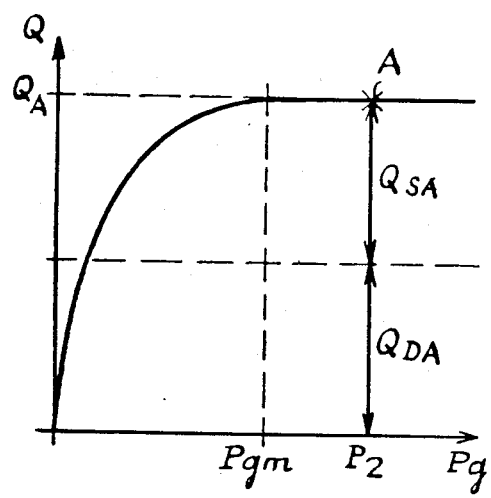
FIGS. 2A and 2B are graphs showing the flow rate (Q) of the pump as a function of its charging pressure ($P_g$) for its normal operating mode (FIG. 2A) and for its cavitation operating mode (FIG. 2B).
Figure 2B:
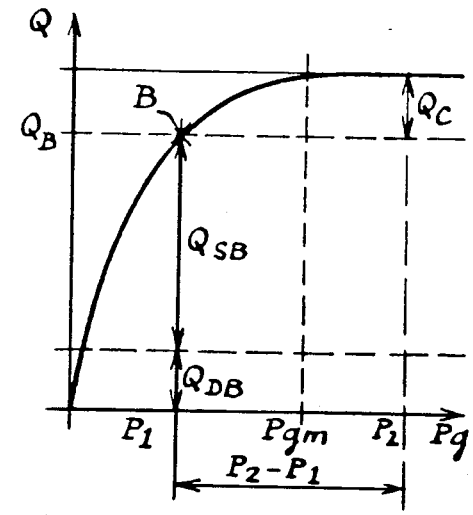

FIGS. 2A and 2B diagrammatically illustrate the operation of the positive displacement pump 4 for a constant rotating speed under normal operating conditions (FIG. 2A) and the operational mode in which cavitation is induced in the pump (FIG. 2B). Each of the Figures show the curve of the flow rate (Q) versus the charging or inlet pressure ($P_g$). As can be seen, the flow rate (Q) is essentially constant at a maximum value beyond a certain minimum charging pressure ($P_{gm}$), but below this minimum pressure cavitation developes in the pump resulting in a drop in the flow rate.

During normal operation, as represented in FIG. 2A, the point A denoting the normal operating pressure is located on the essentially constant portion of the curve and corresponds to a value $P_2$ of the charging pressure. At this pressure $P_2$, the flow rate $Q_A$ of the pump is equal to the sum of the flow $Q_{DA}$ through the metering device 5 and $Q_{SA}$ through the regulating valve 6.

When the operating point of the pump reaches point B (shown in FIG. 2B) on the curve which corresponds to a charging pressure of $P_1$, the flow of the metering device 5 declines to the level denoted by $Q_{DB}$, and the regulating valve 6 achieves its maximum flow rate $Q_{SB}$, the total flow of the pump $Q_B$ equals $Q_{DB} + Q_{SB}$ which is less than the nominal flow rate $Q_A$ by the value $Q_C$. This is due to the cavitation produced by the reduction ($P_2 - P_1$) of the charging pressure $P_g$.

According to an alternative embodiment of the invention, the movement and positioning of the modulating valve 10 may be accomplished by a transducer controlled by the fuel temperature in the return line. This avoids the possibility of inducing cavitation in the positive displacement pump 4 in cases where the fuel tank is cold and a substantial heating of the fuel system would not lead to a prohibitive temperature. The modulating valve 10 would be controlled by a transducer having a thermostat means to detect the temperature of the fuel.

The design parameters of the system as disclosed should limit the reduction of the flow output of positive displacement pump 4 by no more than k %, (wherein k may attain a value of 50% without the danger of the pump stalling).

The foregoing description is provided for illustrative purposes only and should not be construed in any way as limiting the instant invention, the scope of which is defined solely by the appended claims.

What is claimed is:

1. In an aircraft turbojet engine fuel supply system having a fuel tank, the improvements comprising:
    (a) a high-pressure, positive displacement pump having an inlet and an outlet;
    (b) a first supply line connecting the fuel tank to the inlet of the positive displacement pump;
    (c) a second supply line connecting the outlet of the positive displacement pump to the turbojet engine;
    (d) a return line interconnecting the second supply line to the first supply line to return unused fuel to the first supply line;
    (e) a pressure modulating valve disposed in the first supply line downstream of the junction of the return line and the first supply line, and upstream of the inlet of the positive displacement pump to modulate the pressure of the fuel supplied to the positive displacement pump; and,
    (f) control means connected to the pressure modulating valve and the return line to sense a characteristic of the fuel in the return line and adjust the position of the pressure modulating valve in response thereto to reduce the pressure of the fuel supplied to the positive displacement pump to induce cavitation in the pump, when the characteristic reaches a predetermined value.

2. The improved system according to claim 1 wherein the control means senses the pressure of the fuel in the return line.

3. The improved system according to claim 2 wherein the control means comprises:
    (a) a regulating valve in communication with the return line, the position of the valve varying with the pressure of the fuel in the return line; and,
    (b) means connecting the regulating valve to the pressure modulating valve.

4. The improved system according to claim 2 wherein the pressure modulating valve comprises:

(a) a valve seat located downstream of the junction between the return line and the first supply line; and
(b) a conical valve member connected to the control means, the valve member being movable toward and away from the valve seat so as to modulate the pressure of the fuel supplied to the positive displacement pump.

5. The improved system according to claim 1 wherein the control means senses the temperature of the fuel in the return line.

6. The improved system according to claim 5 wherein the pressure modulating valve comprises:
(a) a valve seat located downstream of the junction between the return line and the first supply line; and
(b) a conical valve member connected to the control means, the valve member being movable toward and away from the valve seat so as to modulate the pressure of the fuel supplied to the positive displacement pump.

* * * * *

UNITED STATES PATENT AND TRADEMARK OFFICE
CERTIFICATE OF CORRECTION

PATENT NO. : 4,569,202
DATED : February 11, 1986
INVENTOR(S) : Pierre C. MOUTON

It is certified that error appears in the above-identified patent and that said Letters Patent is hereby corrected as shown below:

Col. 1, line 54: Delete "fixed" and insert --constant output,--

Col. 2, line 26: Delete the "s" from "altitudes" and insert --conditions--.

Col. 2, line 26: Insert --high-- after "during".

Col. 2, line 44: Change "regulated" to --regulating--.

Signed and Sealed this

Second Day of September 1986

[SEAL]

Attest:

DONALD J. QUIGG

Attesting Officer          Commissioner of Patents and Trademarks